(12) United States Patent
Heinisch et al.

(10) Patent No.: US 10,937,283 B2
(45) Date of Patent: Mar. 2, 2021

(54) SWITCHING DEVICE FOR SELECTIVELY SWITCHING AN ELECTRICAL LOAD, IN PARTICULAR FOR SHUTTING DOWN A DANGEROUS MACHINE INSTALLATION

(71) Applicant: PILZ GMBH & CO. KG, Ostfildern (DE)

(72) Inventors: Sascha Heinisch, Ostfildern (DE); Jochen Bauknecht, Ostfildern (DE); Thomas Haeberle, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 16/692,510

(22) Filed: Nov. 22, 2019

(65) Prior Publication Data

US 2020/0175825 A1 Jun. 4, 2020

(30) Foreign Application Priority Data

Nov. 27, 2018 (DE) .......................... 10 2018 129 899

(51) Int. Cl.
*G08B 5/22* (2006.01)
*G08B 21/02* (2006.01)
(Continued)

(52) U.S. Cl.
CPC .............. *G08B 5/22* (2013.01); *G08B 21/02* (2013.01); *H04Q 11/00* (2013.01); *H04Q 2213/1308* (2013.01)

(58) Field of Classification Search
CPC .......... G08B 5/22; G08B 21/02; H04Q 11/00; H04Q 2213/1308; G05F 1/00;
(Continued)

(56) References Cited

U.S. PATENT DOCUMENTS 4,183,462 A * 1/1980 Hideshima ........... G05B 19/048
714/50
6,218,939 B1 * 4/2001 Peper ...................... E05B 47/00
340/545.1
(Continued)

FOREIGN PATENT DOCUMENTS

DE          10011211 A1     9/2001
DE          10016712 A1    10/2001
(Continued)

OTHER PUBLICATIONS

Functional safety and IEC 61508; Sep. 2005; 13 pp.
(Continued)

*Primary Examiner* — Rufus C Point
(74) *Attorney, Agent, or Firm* — Harness, Dickey & Pierce, P.L.C.

(57) ABSTRACT

A switching device shuts down a machine installation in failsafe fashion. The switching device includes an input for a defined input signal, a first output providing a first current path to the machine installation, a display element capable of assuming first and second states, and a processor having first and second modes of operation. The first current path includes a switching element capable of assuming closed and open operating states. In the first mode, the processor controls the switching element in response to the defined input signal in order to selectively close or interrupt the first current path. In the second mode, the processor controls the switching element into the open operating state regardless of the defined input signal. In the first mode, the display element assumes the first and second display states in response to the switching element being in the closed and open operating states, respectively.

19 Claims, 2 Drawing Sheets

(51) Int. Cl.
*H04Q 11/00* (2006.01)
*H01H 85/25* (2006.01)
*G05B 19/048* (2006.01)

(58) Field of Classification Search
CPC ...... G05F 1/565; H01R 13/713; H01H 85/00; H01H 85/02; H01H 85/25; G05B 19/048; G05B 19/00
See application file for complete search history.

(56) References Cited

U.S. PATENT DOCUMENTS

| | | | |
|---|---|---|---|
| 6,285,096 B1* | 9/2001 | Muller | G05B 9/03 307/326 |
| 7,898,118 B2* | 3/2011 | Nitsche | H01H 47/005 307/326 |
| 8,274,771 B2* | 9/2012 | Veil | H01H 47/002 361/93.3 |
| 10,532,714 B2* | 1/2020 | Seid | H01H 39/006 |
| 2003/0011250 A1* | 1/2003 | Pullmann | F16P 3/00 307/326 |
| 2003/0030330 A1 | 2/2003 | Pullmann | |
| 2003/0058602 A1 | 3/2003 | Veil | |
| 2003/0058623 A1* | 3/2003 | Veil | F16P 3/00 361/728 |
| 2004/0064205 A1 | 4/2004 | Kloper et al. | |
| 2008/0278875 A1* | 11/2008 | Bauer | H01H 47/004 361/65 |
| 2009/0008232 A1* | 1/2009 | Dold | H01H 47/002 200/401 |
| 2012/0038460 A1* | 2/2012 | Kawasaki | H04H 20/61 340/6.1 |
| 2014/0159628 A1* | 6/2014 | Brooking | H02P 29/032 318/400.22 |
| 2017/0205777 A1 | 7/2017 | Oster et al. | |
| 2017/0253207 A1* | 9/2017 | Seid | H01H 39/006 |
| 2017/0269631 A1* | 9/2017 | Bauknecht | G05B 19/0428 |

FOREIGN PATENT DOCUMENTS

| | | |
|---|---|---|
| DE | 10020074 A1 | 11/2001 |
| DE | 10020075 A1 | 11/2001 |
| DE | 10108962 A1 | 9/2002 |
| DE | 102014110018 A1 | 1/2016 |
| EP | 2383762 A1 | 11/2011 |
| EP | 3106942 A1 | 12/2016 |
| SD | TDE10016712 A1 | 10/2001 |

OTHER PUBLICATIONS

ZVEI: Automation; Safety of machinery—Notes on the application of standards EN 62061 and EN ISO 13849-1; Jun. 2007; 19 pp.
Pilz GmbH & Co. KG; Safety relays PNOZ e8.1p—Operating Manual-1002226-EN-06; exact date unknown, but at least prior to Nov. 27, 2018; 27 pp.

* cited by examiner

SWITCHING DEVICE FOR SELECTIVELY SWITCHING AN ELECTRICAL LOAD, IN PARTICULAR FOR SHUTTING DOWN A DANGEROUS MACHINE INSTALLATION

CROSS-REFERENCE TO RELATED APPLICATIONS

This application claims priority under the Paris Convention from German patent application 10 2018 129 899.4 filed on Nov. 27, 2018. The entire content of this priority application is incorporated herein by reference.

BACKGROUND OF THE INVENTION

The present invention relates to a switching device for selectively switching on and/or switching off an electrical load, in particular for shutting down a dangerous machine installation in failsafe fashion.

Switching devices are used in many different machines and machine installations in order to selectively switch on or switch off machine functions and/or machine parts. Of particular importance are what are known as safety switching devices, which are used in order to ensure that a machine function and/or a machine part can be operated only if the machine function or the machine part does not present a risk to people. Safety switching devices have to ensure this safety function especially when a fault occurs in the machine installation or the safety switching device itself, for example as a result of component failure or damage to a connecting cable. Particular demands on fail-safety, which are stipulated in relevant standards, such as in particular EN 61508, ISO 13849, EN 62061 and others, therefore apply to safety switching devices. In what follows, safety switching devices are switching devices that satisfy at least performance level (PL) d and/or safety integrity level (SIL) 2 according to the aforementioned standards.

DE 100 11 211 A1 discloses a safety switching device and a system comprising multiple safety switching devices arranged in series with one another. In one exemplary embodiment, an emergency-off switch having two normally-closed contacts is connected to the input section. Two input signals are supplied to the control section via the normally-closed contacts. If the emergency-off switch is operated, the contacts open, which can be detected in the control section because the input signals no longer reach the input section. Additionally, the control section monitors the input signals for plausibility. By way of example, the control section can detect a short, which can be the result of a damaged cable, if the input signals are chosen differently. The control section takes the input signals as a basis for controlling two output switching elements that can be used to shut down a machine in failsafe fashion.

Machines and machine installations frequently have a plurality of sensors/signal transmitters that deliver input signals. The input signals are logically combined with one another in order to switch one or more loads. Many switching devices permit a user to individually define the logic combinations, whether by using a user program programmed in a suitable programming language or by configuring predefined control programs and/or by means of suitable selection and combination of switching devices each with a respectively predefined scope of functions. The definition of the logic combinations between the input signals and the output signals for switching a load can be a very demanding task as the number of input signals and loads increases. Moreover, the definition of the logic combinations is relevant to safety in the case of safety switching devices. It is therefore desirable to detect errors in the logic combinations as early and reliably as possible.

DE 100 20 074 A1 discloses a modular safety switching device system having a plurality of what are known as input modules, which each evaluate safety-relevant signal transmitters, such as for example emergency-off switches and protective door switches, and having at least one output module for operating an actuator in failsafe fashion. The input and output modules can be operated in different modes of operation. A desired mode of operation can be selected on a control module by using keys. The selected mode of operation is displayed by means of LEDs. In order to ensure that the actually selected mode of operation is displayed correctly, the LEDs are monitored. An erroneous LED can therefore be identified and the system is shut down if need be.

DE 100 20 075 A1 discloses a further safety switching device module arrangement having a plurality of input modules and output modules that are arranged in a module series selectable by the user. The logic association between an input module and one or more output modules is in this case dependent on the position of the respective input module in the module series. A user can thus define the logic combinations between the input signals and the actuators/loads on the output modules by means of suitable selection of the module positions of the input modules within the module series.

DE 101 08 962 A1 discloses a method and an apparatus for programming a safety controller. The logic combinations between input signals and output signals of the safety controller are in this case defined on the basis of predefined function-specific program modules that are selected from a set of such program modules.

An instruction manual from Pilz GmbH & Co. KG, Felix-Wankel-Str. 2, 73760 Ostfildern, Germany entitled PNOZ E8.1p and having the item code number 1002226-EN-06 discloses a safety switching device having two "safety outputs" and two LEDs. The LEDs indicate the respective switching state of the safety outputs. A user can therefore tell from the LEDs the operating state that the safety-relevant output switching elements of the safety switching device are in.

SUMMARY OF THE INVENTION

Against this background, it is an object of the present invention to provide a switching device, in particular a safety switching device, that makes it easier for the user to define the logic combinations.

It is another object to provide a switching device that helps to identify and avoid safety-relevant errors prior to start-up of a machine or machine installation.

According to a first aspect, there is provided a switching device for selectively shutting down a dangerous machine installation in failsafe fashion, comprising an input for receiving a defined input signal, comprising a first output providing a first current path to the dangerous machine installation, the first current path comprising a first output switching element capable of assuming either a closed operating state or an open operating state, comprising a display element capable of assuming either a first display state or an alternative second display state, and comprising a control processor having a first active mode of operation and an alternative second active mode of operation, wherein the control processor, in the first active mode of operation, controls the first output switching element in response to the defined input signal in order to selectively close or interrupt the first current path to the dangerous machine installation, wherein the control processor, in the alternative second active mode of operation, controls the first output switching element into open operating state regardless of the defined input signal, wherein the display element assumes the first display state when the control processor is in the first active mode of operation and the first output switching element is in the closed operating state, wherein the display element assumes the alternative second display state when the control processor is in the first active mode of operation and the first output switching element is in the open operating state, and wherein the display element assumes the first display state or the alternative second display state depending on the defined input signal when the control processor is in the second active mode of operation.

According to a second aspect, there is provided a switching device for selectively switching on or switching off an electrical load, comprising an input section for receiving a defined input signal, comprising an output section providing a current path to the electrical load, the current path comprising an output switching element that can assume either a closed operating state or an open operating state, comprising a display element that can assume a first display state or an alternative second display state, and comprising a control section having a first active mode of operation and an alternative second active mode of operation, wherein the control section, in the first active mode of operation, actuates the output switching element on the basis of the defined input signal in order to selectively close or interrupt the current path on the basis of the defined input signal, wherein the control section, in the second active mode of operation, actuates the output switching element so as to interrupt the current path regardless of the defined input signal, wherein the display element assumes the first display state when the control section is in the first active mode of operation and the output switching element is in the closed operating state, wherein the display element assumes the alternative second display state when the control section is in the first active mode of operation and the output switching element is in the open operating state, and wherein the display element assumes the first display state or the alternative second display state depending on the defined input signal when the control section is in the second active mode of operation The control section of the novel switching device has at least two alternative modes of operation that are each active because the switching device can be operated in each of the two modes of operation. The first mode of operation is the "normal" mode of operation (frequently referred to as RUN), in which the control section opens or closes the current path to the electrical load on the basis of the at least one input signal.

The second mode of operation is to a certain extent a simulation mode. On the one hand, the current path to the load is permanently interrupted in the second mode of operation. Consequently, the electrical load is switched off regardless of the defined input signal in the second mode of operation. This is where the second mode of operation differs from the first mode of operation. On the other hand, however, the display element assumes the first display state or the alternative second display state on the basis of the defined input signal in the second mode of operation. This means that the display element can indicate the respective "theoretical" operating state of the output switching element in simulated fashion without the output switching element actually being switched on. In other words, the display element and the output switching element are coupled to one another in the first mode of operation such that an operator can tell the respective actual operating state of the output switching element from the respective display state. The first display state signals that the output switching element is in the closed operating state. The second display state signals that the output switching element is in the open operating state. In some exemplary embodiments, the display element can be an LED that glows in a first colour when the output switching element is in the closed operating state and therefore the current path to the load is closed. When the output switching element is in the open operating state, the LED can be off or can glow in a different colour from in the first display state.

In the second mode of operation, the coupling between display element and output switching element is eliminated. While the output switching element is permanently in the open operating state, the display element can signal the operating state that the output switching element would be in if the switching device were in the first mode of operation.

The decoupling of display element and output switching element in the second mode of operation makes it possible for a user to test the operation of the switching device in an individual application without the electrical load actually being switched on. The user can test an individual configuration on a machine or machine installation without putting the machine or machine installation into a dangerous operating state. Accordingly, the novel switching device allows a convenient and safe start-up test. Any errors in the configuration of the switching device can be detected in the second mode of operation on the basis of the display element before the electrical load is actually started up by means of the first mode of operation. The novel switching device therefore facilitates safe start-up of a machine or machine installation.

In a preferred refinement, the switching device provides a further current path having a further output switching element that is actuated on the basis of the defined input signal both in the first active mode of operation and in the second active mode of operation.

In this refinement, the switching device has at least two output switching elements that form two separate current paths and that are each actuated by the control section on the basis of the defined input signal. However, a change from the first mode of operation to the second mode of operation only affects the output switching element described above. The further output switching element of this refinement is opened or closed on the basis of the defined input signal both in the first mode of operation and in the second mode of operation. In preferred exemplary embodiments, the control section actuates the first output switching element and the further output switching element in sync in the first active mode of operation, so that the first output switching element and the further output switching element open or close largely in sync with one another. In the second active mode of operation, however, the first output switching element and the further output switching element no longer switch in sync. Instead, the first output switching element is permanently open, while the second output switching element is open or closed depending on the defined input signal. In the preferred exemplary embodiments, the further output switching element provides what is known as a signalling output, while the first output switching element switches on and/or off the electrical load. By contrast, the signalling output can advantageously be used to inform for example a superordinate operation controller about the respective operating state of the first output switching element and the load connected thereto. The refinement has the advantage that the second mode of operation (simulation mode) influences only the operating state of the first output switching element, whereas the further output switching element acts equally in the first mode of operation and in the second mode of operation. The refinement therefore allows the novel switching device to be tested prior to start-up of the electrical load in as realistic a manner as possible.

In a further refinement, the switching device has a mode-of-operation selection input for supplying a mode-of-operation selection signal by means of which the control section can be put either into the first mode of operation or into the second mode of operation.

This refinement allows a simple change between the first mode of operation and the second mode of operation and therefore facilitates a function test for the novel switching device immediately during start-up of the electrical load. In some exemplary embodiments, the mode-of-operation selection input may be provided with access protection, for example in the form of a key switch and/or using a password request. Such access protection allows a change of mode of operation to be made dependent on an authorization of the operator. Since the second mode of operation (simulation mode) affords increased safety in comparison with known switching devices and in comparison with the first mode of operation, access protection can be dispensed with in other exemplary embodiments, however.

In a further refinement, the control section actuates the display element in the second active mode of operation. Preferably, the control section also actuates the display element in the first active mode of operation in this refinement.

In this refinement, the control section can change the respective display state of the display element "by itself". As a result, the control section can very easily actuate the display element in a suitable manner in the event of a change between the first and the second mode of operation, so that the display element and the first output switching element are coupled to one another or not. The refinement allows a simple implementation and a simple change between the first and second modes. The refinement is particularly advantageous if the novel switching device is of modular design and the output section is accommodated in a separate output module, because the output module can operate regardless of the selected mode of the control section in this case.

In a further refinement, the output section actuates the display element in the first active mode of operation. In some exemplary embodiments, the output section can also actuate the display element in the second active mode of operation.

In this refinement, the actuation of the display element is assigned to the output section at least in the first mode of operation. The refinement has the advantage that the control section can actuate the output section in the same manner both in the first mode of operation and in the second mode of operation. In particular in the case of a modular implementation in which the output section and the control section are accommodated in separate modules communicating with one another via a bus connection, for example, this refinement can help to minimize the number of bus messages.

In a further refinement, the novel switching device has a plurality of housing modules that can be either combined or detached from one another, wherein a first housing module accommodates the control section, and wherein a second housing module accommodates the output section.

In this refinement, the switching device has a modular design, wherein at least the output section and the control section are arranged in separate housing modules. The refinement allows inexpensive scaling of the novel switching device with regard to the number of inputs and outputs. In particular, a switching device in this refinement can be very easily matched to the size of a machine or machine installation. New machine functions can be implemented inexpensively by adding further modules. The more inputs and outputs the switching device has, the more distinctly the advantages are felt.

In a further refinement, the switching device has a communication bus that connects the control section and the output section to one another.

In this refinement, the control section and the output section exchange bus messages with one another. The bus messages can contain control commands by means of which the output switching element can be taken from its open operating state to its closed operating state. In some preferred exemplary embodiments, the output section informs the control section about the respective instantaneous operating state of the output switching element by means of bus messages. The refinement allows a implementation having many inputs and outputs in a very inexpensive manner.

In a further refinement, the output section has a read-back circuit that generates an instantaneous operating state signal that is representative of the open operating state and/or the closed operating state of the output switching element, wherein the control section actuates the output switching element on the basis of the operating state signal.

This refinement has the advantage that the control section can monitor the respective instantaneous operating state of the output switching element and compare it with an expectation. If the present operating state and the expectation are not concordant, the control section can produce an error message and/or ensure that the electrical load is not started up. In the first mode of operation, the expectation regularly corresponds to the respective present control command. In the second mode of operation, the expectation may by contrast be that the output switching element is in the open operating state. The refinement allows a "genuine" function test for the output section both in the first mode of operation and in the second mode of operation.

In a further refinement, the switching device has a mask memory storing a bit mask that represents the respectively active mode of operation, wherein the output switching element is controlled on the basis of the bit mask.

This refinement allows a very efficient implementation of the novel switching device, in particular with a modular design. The refinement has the advantage that the different behaviour of the output section in the first mode of operation and in the second mode of operation can be achieved substantially by virtue of a respective suitable bit mask being written to the mask memory. Bus cycle times, signal processing times and logic behaviour of the control section and of the output section can be the same in this refinement regardless of the respective selected mode of operation. As a result, this refinement allows a very realistic function test for the switching device prior to start-up of the electrical load.

It goes without saying that the features cited above and those yet to be explained below are usable not only in the respective indicated combination but also in other combinations or on their own without departing from the scope of the present invention.

BRIEF DESCRIPTION OF THE DRAWINGS

Exemplary embodiments of the invention are depicted in the drawing and are explained more specifically in the description below. In the drawing.

DETAILED DESCRIPTION OF THE PREFERRED EMBODIMENTS

Figure 1:
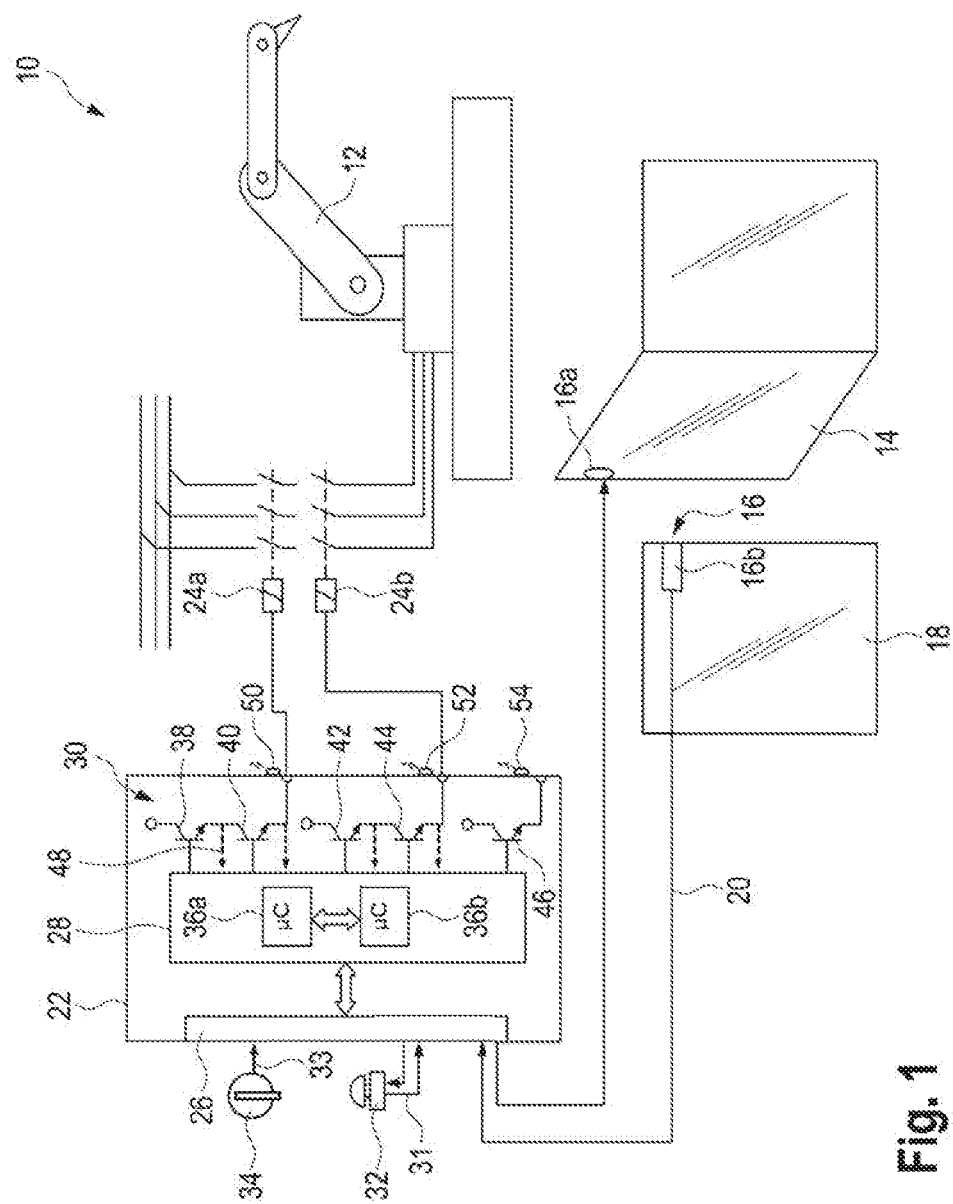
FIG. 1 shows a schematic illustration of a machine installation with an exemplary embodiment of the novel switching device.

In FIG. 1, a machine installation with an exemplary embodiment of the novel switching device is denoted overall by reference numeral 10. The machine installation 10 in the present case includes, by way of example, a robot 12 having a dangerous operating area, which in this case is protected by means of a protective door 14. The protective door has a protective door switch 16 arranged on it. The protective door switch 16 has a door part 16a on the moving protective door 14 and a frame part 16b on a door frame 18, against which the protective door 14 lies in a closed state. The frame part 16b can detect the presence of the door part 16a and generate an input signal 20 that is monitored and evaluated by means of the switching device 22.

Usually, the operating movements of the robot 12, more generally of the machine installation 10, are controlled by means of a machine controller (not shown here for reasons of clarity). In a few exemplary embodiments, the switching device 22 may be integrated in the machine controller. In other exemplary embodiments, the switching device 22 may be implemented separately from the machine controller. In the latter case, the switching device 22 can switch on or off two contactors 24a, 24b, by way of example. The contactors 24a, 24b each have operating contacts that are arranged in a current path to the robot 12. When the contactors 24a, 24b are in the switched-off condition, the operating contacts are open, as shown in FIG. 1, and an operating movement of the robot 12 is prevented.

In the exemplary embodiment shown in FIG. 1, the contactors 24a, 24b are therefore electrical loads that can be switched on and/or switched off by means of the switching device 22. Furthermore, further exemplary embodiments of the novel switching device can be used to switch on or off solenoid valves, electrical drives, pumps and any other electrical loads.

The switching device 22 has an input section 26, a control section 28 and an output section 30. The input signal 20 from the protective door switch 16 is supplied to the input section 26. In addition, the input section 26 is supplied with an input signal 31 from an emergency-off switch 32 and with an input signal 33 from a mode selection switch 34 in the present case, by way of example.

The control section 28 is designed to have two-channel redundancy in this exemplary embodiment, this being depicted by two processors 36a, 36b in the present case. The processors 36a, 36b may include any selection or combination of one or more microprocessors, microcontrollers, ASICs, FPGAs or other logic circuits, which are commercially available or specifically designed as control processor for controlling a switching element. In the preferred embodiment, processors 36a, 36b monitor one another and/or exchange their processing results. A multichannel redundancy design is frequently used for switching devices that are used to shut down a dangerous machine installation in failsafe fashion. Accordingly, the switching device 22 in this exemplary embodiment is a safety switching device or part of a safety controller that meets the requirements for performance level PL d or PL e and/or the requirements according to SIL 2 or SIL 3 as per the standards cited at the outset. As a departure from the depiction in FIG. 1, the input section 26 may be integrated in the control section 28 by virtue of the input signals being routed for example directly to suitable input connections of the processors 36a, 36b.

The output section 30 in this exemplary embodiment has five output switching elements 38, 40, 42, 44, 46. The switching elements 38, 40 are arranged in series with one another and form a first safety output having a current path to the contactor 24a. The switching elements 42, 44 are arranged in series with one another and form a second safety output having a current path to the contactor 24b. The control section 28 can switch off each of the contactors 24a, 24b using two-channel redundancy on the basis of the respective switching elements 38, 40 and 42, 44 arranged in series. This allows the contactors 24a, 24b to be switched off even if one of the switching elements 38, 40 and 42, 44 fails.

The switching element 46 in this exemplary embodiment forms a non-safe signalling output. The control section 28 can use the signalling output to output an information signal. In some preferred exemplary embodiments, the control section 28 actuates the switching elements 38 to 46 largely in sync with one another. The information signal at the signalling output with the switching element 46 can advantageously be used to report the respective operating state (open or closed) of the switching elements 38 to 44 to the machine controller for the robot 12 and/or to another superordinate controller.

FIG. 1 shows each of the switching elements 38 to 46 as a bipolar transistor. Alternatively, some or all switching elements 38 to 46 could be implemented by means of field-effect transistors, thyristors, relays, triacs and so on. It goes without saying that the switching device 22 can have further output switching elements, further safety outputs and/or further signalling outputs.

Reference numeral 48 in FIG. 1 indicates a read-back circuit by means of which the control section 28 can read in the respective operating state of the switching elements 38, 40, 42, 44. In the preferred exemplary embodiments, the control section 28 actuates the switching elements 38 to 46 not only on the basis of the input signals 20, 31, 33 on the input section 26, but also on the basis of the respective operating state signal of the read-back circuits 48. In particular, the control section 28 shuts down the electrical loads at the safety outputs (in the present case that is to say the contactors 24a, 24b) if, even just in one case, a present operating state of the switching elements 38 to 44 does not correspond to the operating state respectively selected by the control section 28. This could occur for example if a transistor fails or a relay contact welds and the applicable switching element is therefore permanently in the closed operating state.

In the preferred exemplary embodiments, the switching device 22 has a plurality of display elements that can indicate the respective operating state of the output switching elements. by way of example, FIG. 1 shows a first LED 50, a second LED 52 and a third LED 54. The first LED 50 indicates the operating state of the switching elements 38, 40 at the first safety output 50. The second LED 52 indicates the operating state of the switching elements 42, 44 at the second safety output. The third LED 54 indicates the operating state of the switching element 46 at the signalling output. In preferred exemplary embodiments, each safety output has an associated suitable display element, for example an LED. Preferably, each signalling output also has an associated display element. The display elements 50, 52,

54 each have a first display state and at least one second display state, which are different from one another. The first display state signals when the associated switching element (or the series of associated switching elements) is in a first operating state. The second display state signals when the associated switching element or the series of associated switching elements is in the second operating state. By way of example, the LEDs 50, 52, 54 are in the switched-on condition and glow when the respective associated switching elements are in the closed operating state, and the LEDs 50, 52, 54 are in the switched-off condition when the respective associated switching elements are in the open state. In further exemplary embodiments, the display elements could have two different active display states in order to signal the operating states of the switching elements, for example different colours. In addition, the display elements 50, 52, 54 could be implemented by means of graphical displays or using other types of display elements, for example mechanical display elements, in further exemplary embodiments.

Figure 2:
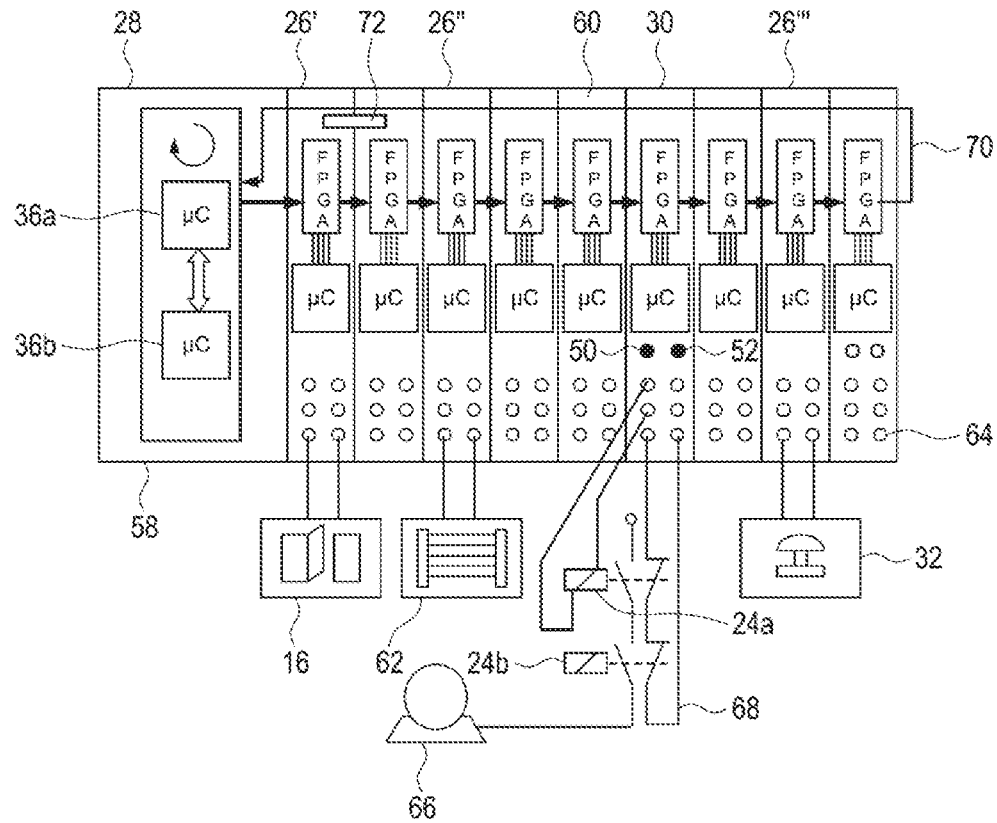
FIG. 2 shows an exemplary embodiment of the switching device from FIG. 1 with a modular design.

FIG. 2 shows an exemplary embodiment of the switching device from FIG. 1 having a modular design. Same reference numerals denote the same elements as before.

The control section 28 is arranged in a first housing module 58 in the present case. Arranged to the side thereof are a plurality of further housing modules 60. The housing modules 58, 60 thus form a module series. Some housing modules 60 accommodate an input section for receiving input signals, such as for example the module 26' with the protective door switch 16 and the module 26''' with the emergency-off switch 32. By way of example, FIG. 2 further shows a light barrier 62 for the housing module 26''. Each of the housing modules 60 has a plurality of connection terminals 64 to which the respective sensors/signal transmitters can be connected. A further housing module in the module series accommodates an output section 30 having connection terminals to which the contactors 24a, 24b are connected (shown only in part here). Reference numeral 66 denotes an electrical drive, which can be a drive of the robot 12, for example. In a departure from the depiction in FIG. 1, the contactors 24a, 24b in the present case are shown with a respective normally-closed contact, which is positively connected to the applicable normally-open contacts in the current path to the drive 66 and therefore moves in sync with the respective normally-open contact. A current path 68 is routed from an output terminal of the output section 30 via the normally-closed contacts, arranged in series, of the contactors 24a, 24b to an input connection of the output section 30. The output section 30 can use the current path 68 to monitor the respective operating state (open or closed) of the contactors 24a, 24b and to report it to the control section 28 as an input signal.

As shown in FIG. 2, the housing modules 60 in this exemplary embodiment each have a circuit denoted by FPGA. The FPGA circuits accommodate a communication interface and form a communication bus 70, by means of which the control section 28 can communicate with the input sections 26', 26'', 26''' and the output section 30. The input sections and output sections can further each have a microcontroller or a different logic circuit that implements the respective function of the input or output section. In principle, the FPGA circuits can also include the function of the microcontroller. It is also possible for housing modules 60 to include both an input section 26 and an output section 30.

In the exemplary embodiment according to FIG. 2, the control section 28 cyclically reads in the input signals from the sensors/signal transmitters 16, 32, 62, 68 and takes this as a basis for generating control signals for the output switching elements. The input sections 26', 26'', 26''' therefore send data corresponding to the input signals of the sensors/signal transmitters 16, 32, 62, 68 to the control section 28 via the communication bus 70 using suitable bus messages 72. The control section 28 generates therefrom a process image of the inputs IPI (input process image), which represents the states of all sensors/signal transmitters. On the basis of the IPI, the control section 28 generates a process image of the outputs OPI (output process image), which represents the control commands for the output switching elements. The control section 28 transmits the OPI to the output section 30 by means of suitable bus messages. The output section 30 can switch on or off the output switching elements on the basis of the OPI.

As already explained above, exemplary embodiments of the novel switching device have at least two different modes of operation. In a first mode of operation, the output switching elements 38 to 46 (see FIG. 1) are switched largely in sync with the display elements 50, 52, 54. Accordingly, a user can identify the respective operating state of the output switching elements on the basis of the display elements. In an alternative second mode of operation, on the other hand, the control section 28 opens the safety-relevant output switching elements 38 to 44 regardless of the defined input signals of the sensors/signal transmitters in order to prevent a hazardous operating mode of the machine installation in this manner. However, the display elements 50, 52, 54 continue to be switched on or off on the basis of the input signals in the second active mode of operation. The display elements 50, 52 thus no longer signal the actual operating state of the switching elements 38 to 44 in this second mode of operation, but rather signal an assumed operating state that the switching elements 38 to 44 would assume if the switching device were in the first mode of operation. Accordingly, the operating states of the switching elements 38 to 44 are simulated in the second mode of operation. The simulation is rendered visible by means of the display elements 50, 52 and makes it easier for a user to configure the switching device 22.

The changeover between the first mode of operation and the second mode of operation can advantageously be achieved by means of the mode selection switch 34. The activation of the display elements in the first and second modes of operation can be realized in various manners.

In some exemplary embodiments, the control section 28 can send the respective selected mode of operation to the output section 30, so that the output section 30 can switch the display elements in sync or not in sync with the output switching elements on the basis of the selected mode of operation. By way of example, the implementation can therefore include the following method steps:

1) The user turns the mode selection switch to the position SIMU.
2) The control section sends all modules a mode message "SIMU mode".
3) All modules remember the mode.
4) The modules send a response to the control section with the acknowledgement of the mode of operation (optional).
5) The control section checks whether all modules have responded (optional).
6) The control section starts cyclic operation.
7) The control section sends each module a process data message with the OPI.
8) Each module leaves its outputs switched off. This takes place regardless of the content of the OPI.

9) Each module switches its LEDs according to the OPI.
10) Each module reads the result of the switching process at its outputs.
11) Each module reads in its inputs.
12) Each module returns a process data message response to the control section (IPI+OPI).
13) The control section checks whether it has received all responses from all modules.
14) The control section checks whether the results (OPIs) meet its expectation. The expectation is that all outputs are in the switched-off condition.
15) The control section checks whether the IPIs are plausible.
16) The control section calculates the new OPIs and begins again at step 7.

Such an implementation has the advantage that an identical number of bus messages each having the same message structure can be used in each of the two modes of operation. A disadvantage is that the respective selected mode of operation needs to be sent from the control section 28 to all affected output sections. Also, each output section must be capable of switching the display elements either in sync or not in sync with the output switching elements, which requires a certain intelligence in the output sections.

In an alternative exemplary embodiment, the control section 28 can therefore switch on or off the display elements, for example by means of suitable bus messages that include a switching command for the display elements. Such an exemplary embodiment can be implemented as follows:
1) The user turns the mode selection switch to position SIMU.
2) The control section starts cyclic operation.
3) The control section sends each module a process data message containing the instruction to switch off the outputs (OPI=0).
4) The control section sends each module an LED message that switches on and off the LEDs in the manner in which this would take place in RUN mode.
5) Each module switches its outputs according to the received process data message.
6) Each module switches its LEDs according to the received LED message.
7) Each module reads the result of the switching process at its outputs.
8) Each module reads in its inputs.
9) Each module returns a process data message response to the control section. (IPI+OPI)
10) The control section checks whether it has received all responses from all modules.
11) The control section checks whether the results (OPIs) meet its expectation. The expectation is that all outputs are in the switched-off condition.
12) The control section checks whether the IPIs are plausible.
13) The control section calculates the new OPIs and begins again at step 3).

This implementation has the advantage that the same method sequence is always performed in the output section regardless of which mode of operation the switching device is in. The output section needs no information about whether the switching device is in the first mode of operation or in the second mode of operation. A disadvantage is that additional bus messages are needed for switching on and off the display elements. In the control section, different processing times can result depending on the selected mode of operation.

Figure 3:
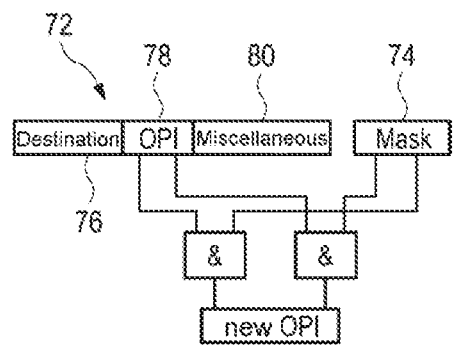
FIG. 3 shows a logic diagram to explain the switching device from FIG. 2.

In further exemplary embodiments, the control section 28 takes the selected mode of operation as a basis for sending a bus message having a bit mask to all output sections 30. The bit mask contains a mask value that is combined with the OPI in the output section 30 in order to generate masked control commands for the output switching elements 38 to 44. FIG. 3 depicts a bus message 72 and a bit mask 74 in simplified fashion. The bus message 72 includes a destination address 76 that identifies the output section 30 within the module series. The bus message 72 further contains the OPI 78 and optional further message components, such as for example a CRC (cyclic redundancy check) for identifying transmission errors. In the output section 30, the bit mask 74 can be ANDed with the OPI in order to determine a new OPI that is used to actuate the output switching elements. In preferred exemplary embodiments of a safety switching device, the AND function is realized using two channels. By way of example, the bit mask 74 can contain a "1" for each output switching element in the first mode of operation, whereas the bit mask 74 contains a "0" for each output switching element in the second mode of operation. Accordingly, the implementation can include the following steps:
1) The user turns the mode selection switch to position SIMU.
2) The control section sends all modules a mask message having the bit mask=00.
3) The control section starts cyclic operation.
4) The control section sends each module a process data message (OPI).
5) Each module switches its LEDs according to the OPI in the process data message.
6) Each module combines the received OPI with the bit mask and thus obtains the "new OPI".
7) Each module switches its outputs according to the "new OPI".
8) Each module reads the result of the switching process at its outputs.
9) Each module reads in its inputs.
10) Each module returns a process data message response to the control section. (IPI+OPI)
11) The control section checks whether it has received all responses from all modules.
12) The control section combines its expectation with the mask and thus obtains the "new expectation".
13) The control section checks whether the results (OPIs) meet the "new expectation".
14) The control section checks whether the IPIs are plausible.
15) The control section calculates the new OPIs and begins again at step 4).

A disadvantage of this implementation is that the bit mask 74 needs to be transmitted to the output section 30 in addition to the OPI, which requires an additional or longer bus message 72. The advantage of this realization, on the other hand, is that the method sequence can be the same in the control section and in the output section regardless of the selected mode of operation. In particular, identical software codes can be executed regardless of the respective selected mode.

In all preferred exemplary embodiments, a non-safety-relevant output switching element 46 is actuated on the basis of the defined input signals both in the first mode of operation and in the second mode of operation, whereas the safety-relevant output switching elements 38 to 44 are actuated on the basis of the defined input signals only in the first mode of operation and are open in the second mode of operation.

What is claimed is:

1. A switching device for selectively shutting down a dangerous machine installation in failsafe fashion, comprising:
   an input for receiving a defined input signal,
   a first output providing a first current path to the dangerous machine installation, the first current path comprising a first output switching element capable of assuming either a closed operating state or an open operating state,
   a display element capable of assuming either a first display state or an alternative second display state, and
   a control processor having a first active mode of operation and an alternative second active mode of operation;
   wherein the control processor, in the first active mode of operation, controls the first output switching element in response to the defined input signal in order to selectively close or interrupt the first current path to the dangerous machine installation;
   wherein the control processor, in the second active mode of operation, controls the first output switching element into the open operating state regardless of the defined input signal;
   wherein the display element assumes the first display state when the control processor is in the first active mode of operation and the first output switching element is in the closed operating state;
   wherein the display element assumes the alternative second display state when the control processor is in the first active mode of operation and the first output switching element is in the open operating state; and
   wherein the display element assumes the first display state or the alternative second display state depending on the defined input signal when the control processor is in the second active mode of operation.

2. The switching device of claim 1, comprising a further current path having a further output switching element controlled by the control processor in response to the defined input signal both in the first active mode of operation and in the second active mode of operation.

3. The switching device of claim 1, further comprising a mode-of-operation selection input for supplying a mode-of-operation selection signal, the control processor assuming either the first active mode of operation or the second active mode of operation in response to the mode-of-operation selection signal.

4. The switching device of claim 1, wherein the control processor actuates the display element in the second active mode of operation.

5. The switching device of claim 1, wherein the first output is comprised in an output section that actuates the display element in the first active mode of operation.

6. The switching device of claim 5, further comprising a plurality of housing modules that can be either combined or detached from one another, wherein a first housing module accommodates the control processor, and wherein a second housing module accommodates the output section.

7. The switching device of claim 5, further comprising a communication bus that communicatively connects the control processor and the output section.

8. The switching device of claim 5, wherein the output section has a read-back circuit that generates an operating state signal that is representative of the open operating state or the closed operating state of the first output switching element.

9. The switching device of claim 8, wherein the control processor actuates the first output switching element on the basis of the operating state signal.

10. The switching device of claim 1, further comprising a mask memory storing a bit mask that respectively represents the first active mode of operation or the second active mode of operation, wherein the first output switching element is controlled on the basis of the bit mask.

11. A switching device for selectively switching on or switching off an electrical load, comprising:
    an input section for receiving a defined input signal,
    an output section providing a current path to the electrical load, the current path comprising an output switching element that can assume either a closed operating state or an open operating state,
    a display element that can assume a first display state or an alternative second display state, and
    a control section having a first active mode of operation and an alternative second active mode of operation;
    wherein the control section, in the first active mode of operation, actuates the output switching element on the basis of the defined input signal in order to selectively close or interrupt the current path on the basis of the defined input signal;
    wherein the control section, in the second active mode of operation, actuates the output switching element so as to interrupt the current path regardless of the defined input signal;
    wherein the display element assumes the first display state when the control section is in the first active mode of operation and the output switching element is in the closed operating state;
    wherein the display element assumes the alternative second display state when the control section is in the first active mode of operation and the output switching element is in the open operating state; and
    wherein the display element assumes the first display state or the alternative second display state depending on the defined input signal when the control section is in the second active mode of operation.

12. The switching device of claim 11, wherein the output section has a further current path having a further output switching element, and wherein the control section actuates the further output switching element on the basis of the defined input signal both in the first active mode of operation and in the second active mode of operation.

13. The switching device of claim 11, further comprising a mode-of-operation selection input for receiving a mode-of-operation selection signal by means of which the control section can selectively be put either into the first active mode of operation or into the second active mode of operation.

14. The switching device of claim 11, wherein the control section actuates the display element in the second active mode of operation.

15. The switching device of claim 11, wherein the output section actuates the display element in the first active mode of operation.

16. The switching device of claim 11, further comprising a plurality of housing modules that can be either combined or detached from one another, wherein a first housing module accommodates the control section, and wherein a second housing module accommodates the output section.

17. The switching device of claim 11, further comprising a communication bus that communicatively connects the control section and the output section.

18. The switching device of claim 11, wherein the output section has a read-back circuit that generates an operating state signal that is representative of the open operating state or the closed operating state of the output switching element, wherein the control section actuates the output switching element on the basis of the operating state signal.

19. The switching device of claim 11, further comprising a mask memory storing a bit mask that respectively represents the first active mode of operation or the second active mode of operation, wherein the output switching element is controlled on the basis of the bit mask.

* * * * *